(12) United States Patent
Steinbauer et al.

(10) Patent No.: US 12,552,041 B2
(45) Date of Patent: Feb. 17, 2026

(54) SYSTEM FOR SEPARATING AND IDENTIFYING ARTICLES

(71) Applicant: Knapp AG, Hart bei Graz (AT)

(72) Inventors: Christian Steinbauer, Hart bei Graz (AT); Franz Mathi, Hart bei Graz (AT); Wolfgang Puntigam, Hart bei Graz (AT); Marc Pendl, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 326 days.

(21) Appl. No.: 18/264,114

(22) PCT Filed: Nov. 2, 2021

(86) PCT No.: PCT/AT2021/060400
§ 371 (c)(1),
(2) Date: Aug. 3, 2023

(87) PCT Pub. No.: WO2022/165545
PCT Pub. Date: Aug. 11, 2022

(65) Prior Publication Data
US 2024/0033932 A1    Feb. 1, 2024

(30) Foreign Application Priority Data
Feb. 4, 2021 (AT) .............................. A 50071/2021

(51) Int. Cl.
*B25J 9/16* (2006.01)
*B65G 47/14* (2006.01)

(52) U.S. Cl.
CPC ........ *B25J 9/1697* (2013.01); *B65G 47/1478* (2013.01); *B65G 2203/0216* (2013.01); *B65G 2203/0233* (2013.01)

(58) Field of Classification Search
USPC .................................................. 700/245–264
See application file for complete search history.

(56) References Cited

U.S. PATENT DOCUMENTS 10,438,034 B2 * 10/2019 Wagner ................... B65G 47/46
10,537,990 B2 *  1/2020 Heath ..................... B25J 9/1682
(Continued)

FOREIGN PATENT DOCUMENTS

| CA | 3061181 A1 * | 11/2018 | ............ B25J 9/0084 |
| EP | 2477914 B1 | 4/2013 | |
| WO | 2017/027897 A1 | 2/2017 | |

OTHER PUBLICATIONS

International Search Report, mailed Feb. 2, 2022, from PCT/AT2021/060400.

*Primary Examiner* — Jonathan L Sample
(74) *Attorney, Agent, or Firm* — Workman Nydegger (57) ABSTRACT

A system configured to separate and identify articles, and the system including a manipulation unit configured to move articles from the source position in the direction of the discharging conveyor element, and the manipulation unit is configured to pick up the articles from the source position according to the position and/or orientation detected by the sensor unit, and an identification unit, which is configured to identify the articles moved by the manipulation unit in the direction of the discharging conveyor element, and the discharging conveyor element includes a position conveyor, which is configured to convey the article to a second position (P2) if this has not been identified by the identification unit, and the second position (P2) is arranged within a handle region of the manipulation unit.

16 Claims, 6 Drawing Sheets

(56) References Cited

U.S. PATENT DOCUMENTS

| | | | |
|---|---|---|---|
| 10,807,808 B1* | 10/2020 | Rodgers | B25J 9/0093 |
| 10,906,188 B1* | 2/2021 | Sun | B25J 13/08 |
| 2003/0168315 A1* | 9/2003 | Ballestrazzi | B65H 5/08 |
| | | | 198/459.1 |
| 2009/0028686 A1* | 1/2009 | Tallis | B65G 61/00 |
| | | | 414/793.4 |
| 2017/0349385 A1* | 12/2017 | Moroni | B07C 1/06 |
| 2018/0022557 A1* | 1/2018 | Tanaka | B65G 57/245 |
| | | | 53/500 |
| 2018/0127219 A1* | 5/2018 | Wagner | B65G 47/40 |
| 2018/0345324 A1* | 12/2018 | Hillerich, Jr. | B07C 5/3422 |
| 2019/0185267 A1* | 6/2019 | Mattern | B65B 5/105 |
| 2020/0080944 A1* | 3/2020 | Liu | G01N 21/8851 |
| 2020/0160011 A1* | 5/2020 | Wagner | B65G 21/2036 |
| 2022/0289416 A1* | 9/2022 | Finnsson | B65B 43/60 |

* cited by examiner

SYSTEM FOR SEPARATING AND IDENTIFYING ARTICLES

FIELD OF THE INVENTION

The invention relates to a system for separating and identifying articles, comprising a source position for providing articles, preferably in containers, a discharging conveyor element for discharging identified and separated articles, a manipulation unit for moving articles from the source position in the direction of the discharging conveyor element, a sensor unit for detecting the position and/or orientation of the articles at the source position, wherein the manipulation unit is configured to pick up the articles at the source position according to the position and/or orientation detected by the sensor unit, and an identification unit, which is configured to identify the articles moved by the manipulation in the direction of the discharging conveyor element.

BACKGROUND OF THE INVENTION

It is known that articles are stored and transported, respectively, in source containers and are to be separated at a later point of time, for example, in order to re-store a certain number of articles in a target container for dispatch or the like. In order to automatize this process, manipulation units are used, i.e. robots having a gripping function, which pick up individual articles from the source containers for separation. For a unique identification of the articles picked up, in particular the methods described in the following are known.

EP2477914B1 discloses a system and a method for separating and order-picking articles. Thereby, articles that are supplied on a first transport apparatus will be detected by a first sensor in the position and transferred by means of a handling apparatus to a second transport apparatus, wherein the article is passed by a detection apparatus for identification during the transfer. Non-identifiable articles are placed onto a storage zone, picked up in a different position and again passed by the detection apparatus for identification.

In this regard, it has proven to be disadvantageous that articles, which cannot be identified by the detection apparatus for various reasons, will block the system. Articles are, for example, again and again held in front of the detection apparatus without any success, for example, because of a defect barcode in spite of numerous times of storage within the storage zone and a re-pick-up in a changed position within an endless loop. The manipulation unit is, hence, permanently busy if there is present a non-identifiable article, whereby conveying further articles for a certain period of time will de facto stop. By way of an extension of the method, in which the non-identifiable article will be moved, following a number of failed attempts, to a further failure zone not further described, the disadvantage described may be only slightly reduced.

A particular disadvantage, hence, is the limited speed of the manipulation apparatus, as a non-identifiable article will occupy the manipulation apparatus for a relatively long period of time. There may here be reached throughput rates of only several hundred articles per hour, in particular if articles have to be moved across the storage zone.

From the U.S. Pat. No. 10,438,034B2 there has been known a system, in which products are made to drop from a first supplying conveyor system for identification individually through a detection apparatus. The products are then collected by a primary transport system and transported in parallel to the supplying conveyor system in the opposite direction to a discharge point, where non-identified products are again moved to the detection apparatus via discharge in the direction of the supplying conveyor system. A similar solution is also applied by the company Soft Robotics.

Also here it has been proven to be of disadvantage that articles, which cannot be identified by the detection apparatus for various reasons, will block the system. Articles will, for example, circulate without any success within the system due to a defect barcode in an endless loop. As the non-identifiable products will again and again be mixed into the supplying stream of products, the throughput rate of successfully identified products will drop inversely to the circulating and non-identifiable products. Product supply has to be discontinued in regular intervals, and the circulating products have to be removed from the system.

At the same time, it is also a problem to mix the non-identifiable products with newly supplied products, as the new products have already been allocated to another product type or batch, respectively, and are mixed with circulating products of the previous product type or batch, respectively. When being used in the field of order picking, it is additionally disadvantageous that order targets have to wait for a non-defined period of time for circulating and unidentifiable products.

The US 2018/345324 A1 describes a sorting system for identifying and separating articles. In this system, there is existent a "main conveyor", from which packages are to be moved to one of several separation stations, which is realized by controlling various roller conveyors. Further, there is disclosed a method for identifying and for controlling, respectively, the manipulation unit at a separation station, wherein this identification is realized even before the packages will be picked up by the manipulation unit.

SUMMARY OF THE INVENTION

It is, hence, the task of the invention to provide a system for separating and identifying articles, which overcomes the disadvantages outlined above.

This task is solved by a system for separating and identifying articles, comprising a source position for providing articles, preferably in containers, a discharging conveyor element for discharging identified and separated articles, a manipulation unit for moving articles from the source position in the direction of the discharging conveyor element, a sensor unit for detecting the position and/or orientation of the articles at the source position, wherein the manipulation unit is configured to pick up the articles at the source position according to the position and/or orientation detected by the sensor unit, and an identification unit, which is configured to identify the articles moved by the manipulation unit in the direction of the discharging conveyor element, wherein the discharging conveyor element comprises a position conveyor, which is configured to convey the article to a first position if this has been identified by the identification unit and to convey the article to a second position if this has not been identified by the identification unit, wherein the articles at the second position are present separate from the articles at the source position, wherein the second position is arranged within a handle region of the manipulation unit and wherein the manipulation unit is configured to again pick up an article present at the second position and to move it via the identification unit to the position conveyor.

The system according to the invention has the advantage that there is provided an especially fast working separation and identification system, in which non-identifiable articles, however, will not be combined with non-identified and non-separated articles at the source position. In this way, all articles, which have been moved at least once by the identification unit, will remain separated and permanently traceable, irrespective of the result of identification.

In regard to EP2477914B1, the invention has in particular the advantage that the method may be performed substantially faster as the articles do not have to be placed on a side table by the identification unit, picked up from another position and moved again through the identification unit following failed attempts. By the position conveyor situated downstream of the identification unit there is obtained that the manipulation unit remains freely movable during the identification process and will also not be in charge of identification-dependent pre-sorting, which is assumed by the position conveyor.

In regard to U.S. Pat. No. 10,438,034B2, the system according to the invention has the advantage that non-identifiable articles will not be mixed with newly supplied articles, i.e. according to the invention, separate articles will yet remain separated, on the one hand side, in order to not mix charge numbers and, on the other side, also to count the number of failed attempts in the course of identification in order to remove these articles at an early stage from the cycle, if required.

The manipulation unit is especially preferably configured to release the article picked up from the source position at a release position, which is situated in the direction of movement of the article upstream of the identification unit, and to move, following the release of the article, immediately for picking up a new article in the direction of the source position if there is no article present at the second position or to move to the second position for picking up a previously non-identifiable article in order to pick up this article and move it again to the identification apparatus. In this way, the method may be realized as quickly as possible, without the manipulation unit having to wait unnecessarily long, for example, for the result of the identification. Using this control of the manipulation unit, there may reached throughput rates of only several hundreds of articles per hour as in prior art.

In order to scan the articles as comprehensively as possible and thus to identify them as accurately as possible, the identification unit has an entry region and an exit region spaced apart therefrom, whereby the entry region is preferably arranged above the exit region. The entry region and the exit region spaced apart therefrom enable a spatially extended detection region, whereby in particular a three-dimensional image of the article can be recorded and/or recording of identification features in places that are difficult to access is enabled.

It is further preferred that the manipulation unit, the identification unit and the position conveyor are arranged in such a way that an article released by the manipulation unit will drop or slide through the identification unit and come to rest on the position conveyor downstream of the identification unit. This enables a particularly fast identification process, as the article can pass through the identification unit by gravity without the need for a separate conveyor device, which would guide the article through the identification unit. In further embodiments, an article released by the manipulation unit could also be conveyed through the identification unit in a different way, in particular pushed through the identification unit, for example by means of a so-called pusher.

It is preferred that the identification unit has at least one individual sensor, particularly preferably at least two individual sensors, which are, for example, cameras having different orientation, scanners, particularly barcode scanners, or RFID readers. By means of several individual sensors, the article may be identified in particular from different directions and/or also in different ways. For example, optical cameras can record the article from at least two different directions and/or individual sensors of different types may be used, such as a barcode scanner in combination with an optical camera and/or an RFID reader. However, depending on the embodiment, it may be sufficient to provide only one individual sensor.

In a particularly preferred embodiment, the system according to the invention comprises a control unit having a counter, which is configured to record the number of identification attempts of a respective non-identifiable article. In this embodiment, there may be in particular provided that the control unit, the position conveyor and/or the manipulation unit are configured to move a non-identifiable article to a third position or to allocate to this a predetermined identification if the number of identification attempts counted by the counter has reached a predetermined value. In this way, there may be in particular prevented a non-identifiable article from indefinitely circulating in the system and thus taking up unnecessary resources, for example if a barcode on the article is damaged. The third position may be a so-called special handling position, from where the article is discarded or manually identified by an operator. The predetermined identification may be, for example, a marker having the content "non-identifiable". In other cases, the recording of the identification attempts could alternatively or additionally serve statistical purposes, for example, in order to determine, which articles are difficult to identify, whereupon, for example, the identification apparatus may be adapted to these articles.

In order to increase the chances of subsequent identification attempts, the manipulation unit may be configured to release an article picked up from the second position to the identification unit in a different position than articles picked up from the source position.

The sensor unit may be provided in two preferred embodiments. In the first preferred embodiment, the sensor unit has a field of vision, in which articles to be picked up are situated at the source position, wherein a further, i.e. second, sensor unit is provided, which has a further, i.e. second, field of vision, in which the second position is situated. This has the advantage that the sensor units may have focused field of visions, whereby the position and/or orientation of the articles may be determined particularly precisely. In the second preferred embodiment, the sensor unit has a field of vision, in which both articles to be picked up at the source position as well as at the second position are situated on the position conveyor. This has the advantage that only one sensor unit needs to be provided. The segmentation of the image may be realized by software, for example by the control unit.

The position conveyor may be provided in different variants. In a first variant, the position conveyor may be configured to convey articles from a zero position, at which the articles will come to rest downstream of the identification unit on the position conveyor, either to the first position or to the second position. In this variant, the article does not pass through the second position on its way to the first position, i.e. the first position and the second position are in different directions starting from the zero position.

For example, in this variant, a single belt conveyor may be provided for moving the articles from the zero position to both the first position and the second position, wherein the belt conveyor may be moved opposite directions. For example, the first and second positions are on different sides of the zero position. In other embodiments, the position conveyor may comprise a disc conveyor, a turntable, a push conveyor, a pusher, a rocker or a drop flap.

In a second variant, the position conveyor may be configured to move articles from a zero position, at which the articles will come to rest downstream of the identification unit on the position conveyor, to the first position via the second position. In the second variant, the position conveyor may comprise a single belt conveyor for moving articles from the zero position to the first position and to the second position, wherein the belt conveyor is configured to stop articles at the first position and at the second position. In this position conveyor, it is sufficient for the belt conveyor to be movable in only one direction. In this variant, an article may pass through the second position on its way to the first position.

BRIEF DESCRIPTION OF THE DRAWINGS

Advantageous and non-limiting embodiments of the invention are explained in greater detail in the following by way of the drawings.

DETAILED DESCRIPTION OF EMBODIMENTS

Figure 1:
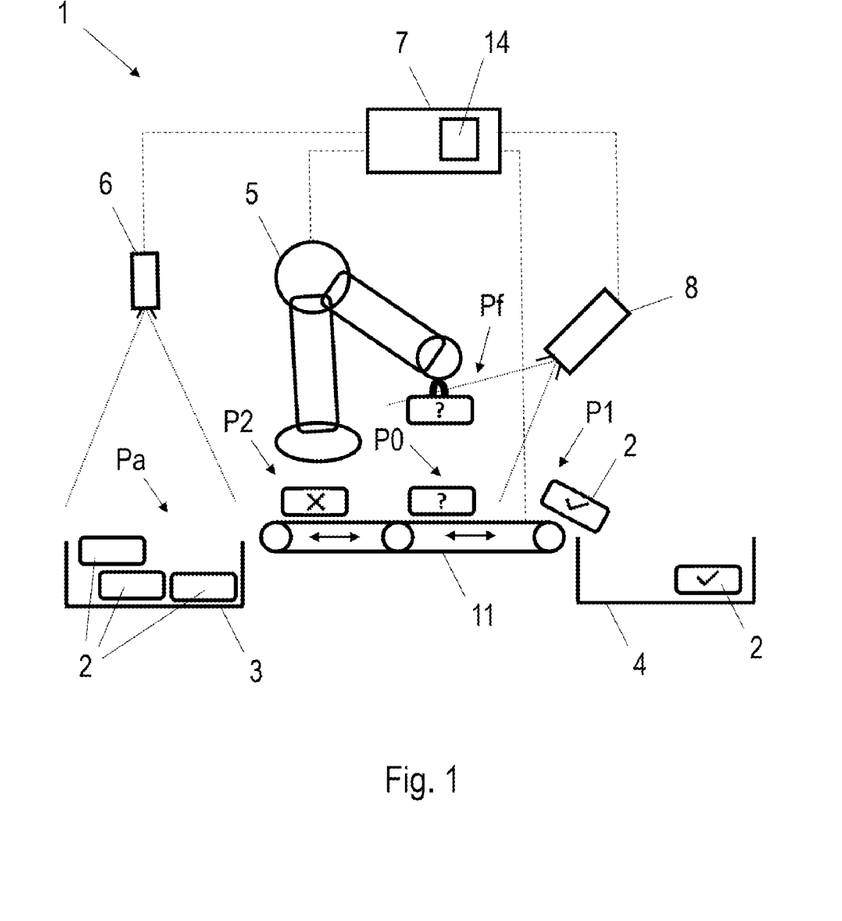
FIG. 1 shows a first embodiment of the system according to the invention for separating and identifying articles in a schematic view.

FIG. 1 shows a system for separating and identifying articles 2. In this system 1, articles 2 are supplied, for example in containers not further shown, on a supplying conveyor element 3 and discharged on a discharging conveyor element 4. The articles 2 are not identified per se on the conveyor element 3, but they may be assigned a batch number. For example, all articles 2 from a container may be assigned a common batch number. The aim is that the articles 2 are moved onto the discharging conveyor element 4 and are clearly identified there, wherein the batch number may preferably also be assigned to the articles 2.

The supplying conveyor element 3 and the discharging conveyor element 4 may, for example, each be belt conveyors that may be electromechanically driven. However, one or both of the conveyor elements 3, 4 may also be designed differently and, for example, may also be non-driven, such as a roller conveyor for the containers of the articles 2. In more general embodiments, the supplying conveyor element 3 may also be a source position, at which a trolley, in particular a shopping trolley, or a D container may be positioned. The embodiments shown below are specifically explained for a supplying conveyor element 3, but may also be implemented with a general source position, to which the articles 2 or containers are supplied in a manual way.

In order to move the articles 2 from the supplying conveyor element 3 onto the discharging conveyor element 4, a manipulation unit 5 is used, for example a robot having one or more gripper arms.

In order for the manipulation unit 5 to know where an article 2 to be picked up is located on the supplying conveyor element 3, there is provided a sensor unit 6, which has a field of vision, in which the articles 2 to be picked up are located on the supplying conveyor element 3. The sensor unit 6 is, for example, a camera and will detect the position and/or orientation of articles 2 on the supplying conveyor element 3 and transfers this, for example, to a control unit 7 controlling the manipulation unit 5 or directly to the manipulation unit 5. The evaluation of the images or data recorded by the sensor unit 6 may also be carried out by the control unit 7.

As soon as the manipulation unit 5 knows the position and/or orientation of the article 2 on the supplying belt conveyor, it may pick up the detected article 2 in order to move it in the direction of the discharging conveyor element 4. Depending on the embodiment, the manipulation unit 5 does not immediately place the article 2 onto the discharging conveyor element 4, but releases it beforehand at a release position Pf, whereby the article 2 will drop or slide through the identification unit 8 described below. The identification unit 8 is usually arranged between the release position Pf of the manipulation unit 5 and the discharging conveyor element 4, but it may also be arranged on the latter. The manipulation unit 5 will usually release the article 2 before it enters a detection region of the identification unit 8.

The identification unit 8 is configured to uniquely identify the article 2, which is understood to mean the assignment of a product designation, for example a model number, or also the assignment of a global identification such as a serial number.

In order to identify the articles 2, the identification unit 8 has one or several individual sensors 9 such as cameras for recording a two- or three-dimensional image, barcode readers or RFID readers. It will be appreciated that different types of individual sensors 9 may be combined. The articles 2 themselves may, but need not, have an identification feature such as a barcode, a QR code or a model or serial number to facilitate identification by means of the identification unit 8. If the article does not have an identification feature or if it cannot be read because it is covered or damaged, the article 2 may also be identified, for example, via optical cameras on the basis of its shape, size, colour, etc.

Figure 3:
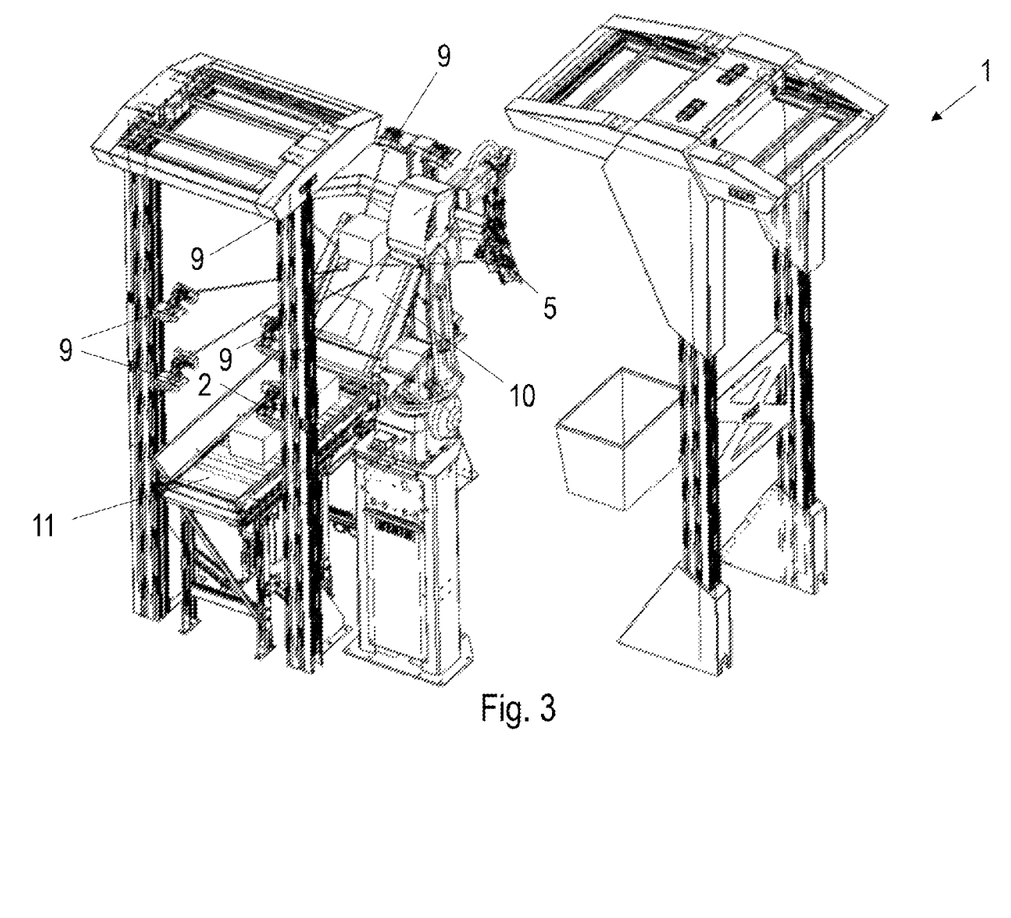
FIG. 3 shows a perspective view of a portion of the system according to the invention.
Figure 4:
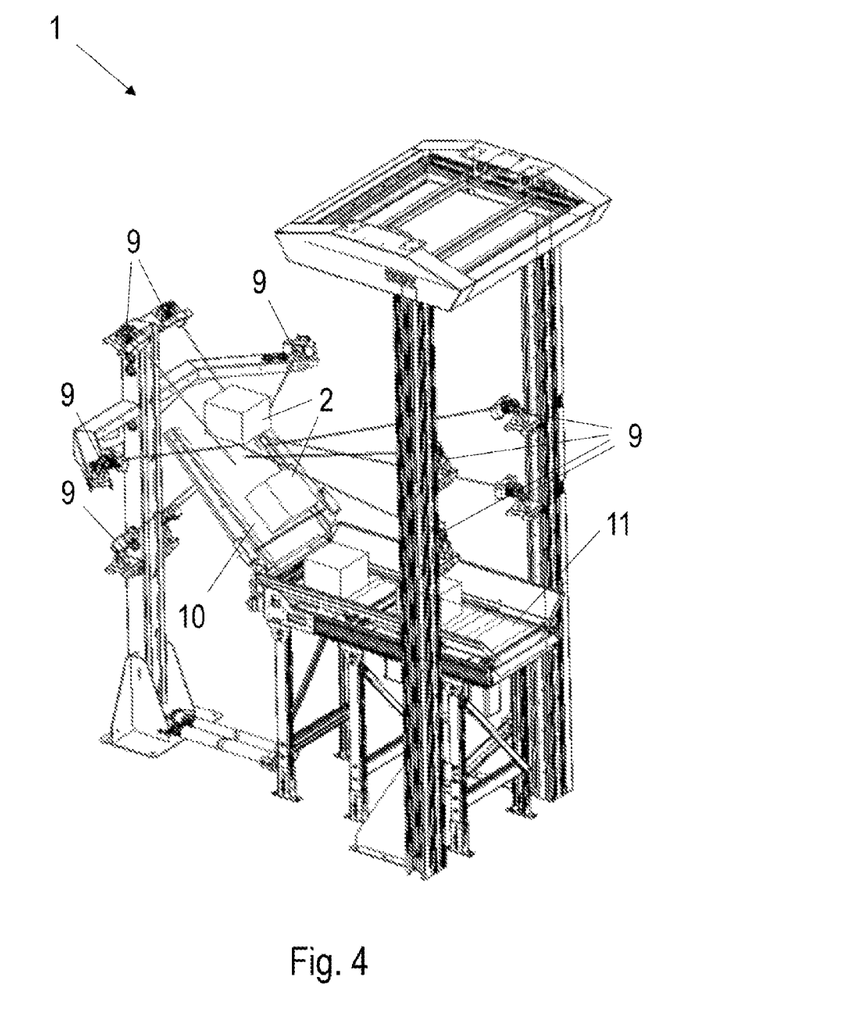
FIG. 4 shows a further perspective view of a portion of the system according to the invention.

In the embodiments of FIGS. 3 and 4, an identification unit 8 is shown in each case, which has several individual sensors 9 that pick up an article 2 from several directions. Thus, it is not relevant for the identification on which side of the article 2 the identification feature is arranged or in which position the article 2 is transferred to the identification unit 8. Alternatively or additionally, the several individual sensors 9 can also be used to record a three-dimensional image of the article 2 and thus identify it.

In order to move the article 2 through the identification unit 8, the manipulation unit 5 will release the article 2 at the release position Pf, i.e. will let go of the article 2, such that the article 2 will drop, slide or will otherwise be moved through the identification unit 8. In one embodiment, the release position Pf of the article 2 by the manipulation unit 5, the identification unit 8 and the position P0, where the article 2 will come to rest on the discharging conveyor element 4, could be arranged along a vertical line, i.e. the article 2 will drop freely through the identification unit 8.

In another embodiment, the identification unit 8 could comprise a chute 10, as shown for example in FIGS. 3 and 4. In this case, the manipulation unit 8 releases the article 2 above the chute 10 so that the article 2 slides on the chute 10 through the identification unit 8, is identified in the process and comes to rest on the position P0 on the discharging conveyor element 4. If a chute 10 is used, it will preferably be transparent so that individual sensors 9 of the identification unit 8 may also be arranged behind or below the chute 10 and may thus also pick up the article 2 from a position behind or below the chute 10.

The provision of several individual sensors 9 usually results in an identification unit 8 having a spatially extended detection region with an entry region and an exit region. If the article 2 is to be moved driven by gravity through the identification unit 8, i.e. if the article 2 is to drop or slide through the identification unit 8, the entry region will be arranged higher than the exit region.

In both of the above mentioned embodiments, the article 2 is thus moved driven by gravity through the identification unit 8. In yet other embodiments, the manipulation unit 5 could place the article 2 directly onto the discharging belt conveyor 4, whereupon it will be conveyed by the latter through the identification unit 8, whereby the article 2 will come to rest downstream of the identification unit 8 at the position P0.

As soon as the article 2 has been moved by the identification unit 8, it will come to rest on a position conveyor 11 at the position P0 mentioned above, i.e. it will come to rest there briefly or will be moved on immediately. Depending on whether the article 2 could be identified by the identification unit 8 or not, it is then moved by the position conveyor 11 either to a first position P1 or to a second position P2 spaced apart therefrom.

If the article 2 has been identified by the identification unit 8, the article 2 is conveyed to the first position P1. The first position P1 may be seen as an exit region for the now separated and identified article 2. Moving article 2 to position P1 may be followed, for example, by the following steps: A position-controlled transport to a sorting system, in particular a pocket sorter, a position-controlled discharge to collecting belts, in particular for order picking, or a position-controlled pick-up of the articles into a product storage or into a product picking system, respectively, as known, for example, from the WO 2017/027897.

If the article 2 has not been identified, it is moved to the second position P2. The position P2 is situated in a handle region of the manipulation unit 5 and may thus be picked up again by the manipulation unit 5 and moved again for another identification attempt by the identification unit 8. The manipulation unit 5 is thus configured to pick up articles 2 not only from the supplying conveyor element 3, but also from the second position P2. The manipulation unit 5 may thus move to at least three positions, namely a pick-up position Pa on the supplying conveyor element 4, the release position Pf, at which the article 2 is released by the manipulation unit 5 and moved by the identification unit 8, and the second position P2 for picking up the article 2 again if it has not been identified. The manipulation unit 5 may move from each of the three positions to the respectively others and is not limited to a fixed sequence.

The second position P2 may thus be regarded as the pick-up position for the manipulation unit 5. The second position P2 is situated, for example, at or directly next to the position conveyor 11 or the discharging conveyor element 4, respectively, and in particular not at the supplying conveyor element 3, so that it is clear at all times which articles 2 have not yet been identified. Since the non-identifiable articles 2 are not returned to the supplying belt conveyor 3, it is excluded that non-identifiable articles 2 are mixed with previously non-identified articles 2. In order to increase the chances of an article 2 being non-identifiable again, the manipulation unit 5 may be configured to release an article 2 picked up from position P2 in a different position at the release position Pf above the identification unit 8 than articles 2 that have been picked up from the supplying conveyor element 3. These different positions may be randomly selected or predetermined for different identification attempt values (e.g. first attempt, second attempt, etc.).

Figure 2:
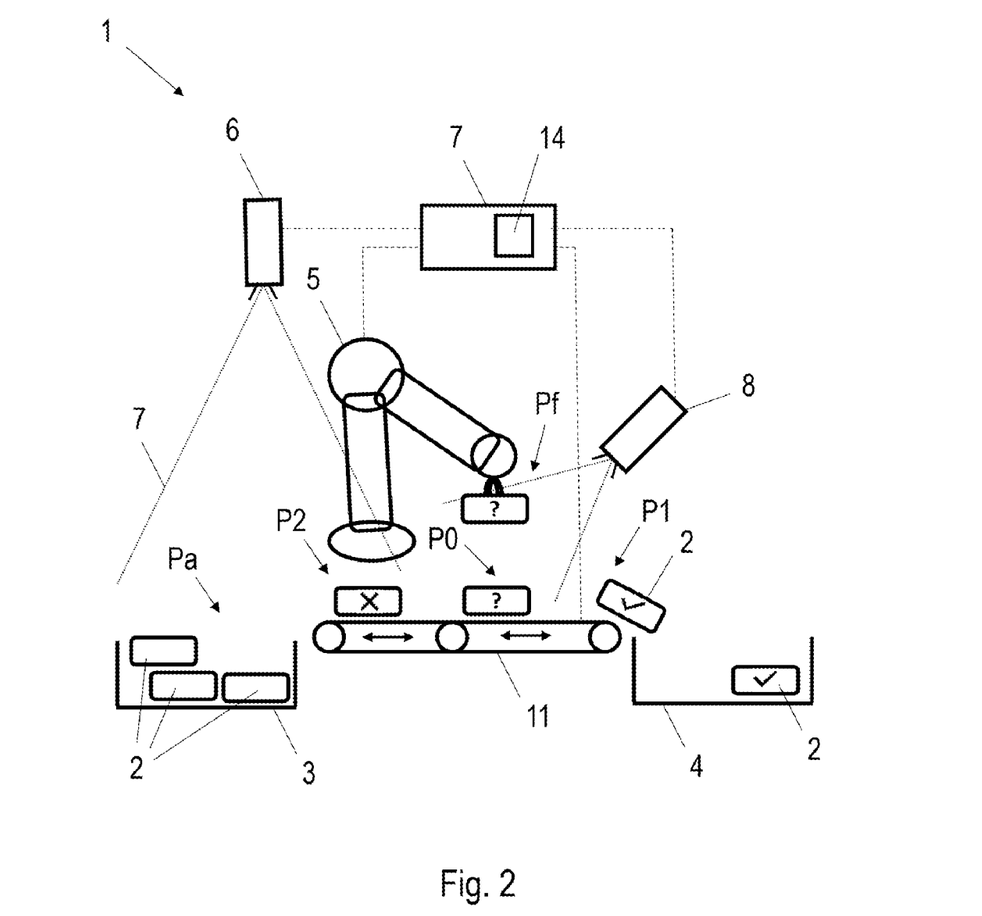
FIG. 2 shows a second embodiment of the system according to the invention for separating and identifying articles in a schematic view.

The position conveyor 11 mentioned may be separate from, form part of, or be the same as the discharging conveyor element 4. As shown in FIGS. 1 and 2, the position conveyor 11 may be formed by a belt conveyor, which is movable in opposite directions. In the embodiments of FIGS. 3 and 4, the position conveyor 11 is a belt conveyor, which is movable in one direction. The first and second positions P1, P2 are two different stopping positions along a linear path. However, the position conveyor 11 is not limited to these embodiments but may rather also be a disc conveyor, turntable, push conveyor, pusher, rocker or drop flap.

In one embodiment shown in FIG. 1, the sensor unit 6 has a field of vision, in which there is situated only the pick-up position on the supplying conveyor element 3. In this case, a further second sensor unit 6b (FIG. 6) may be provided, in the field of vision of which there is situated the second position P2. In an alternative embodiment, which is shown in FIG. 2, the sensor unit 6 has a field of vision, in which both the pick-up position Pa on the supplying conveyor element 3 as well as the second position P2 on the position conveyor 11 are situated, whereby only a single sensor unit 6 will be necessary.

The control unit 7 mentioned may be connected to one or several of the following components: manipulation unit 5, sensor unit 6, further sensor unit, and identification unit 8. The control unit 7 may be provided as a separate computing unit or may be integrated in one of the components mentioned. The control unit 7 controls the manipulation unit 5 in response to the data received from the sensor unit 6, the further sensor unit, and the identification unit 8.

In particular, the control unit 7 may comprise a counter 14 to count how many times an article 2 has been passed through the identification unit 8. This is possible as it is known at any time whether the manipulation unit 5 has picked up a new article from the pick-up position Pa or a previously non-identifiable article from the second position P2. The counter 14 may assign a temporary identification to a non-identifiable article 2 and increase a counter value for misidentifications by one each time this article 2 is moved back to position P2 or is picked up by the manipulation unit 5 at the second position P2.

In particular, a list or database may be maintained in the control unit 7, in which each article 2 picked up or identified or non-identifiable is being tracked. In particular, this may provide a sequence of identified articles 2 discharged onto the discharging belt conveyor 4 such that subsequent processing devices may be informed of the identification of an article 2 situated on the discharging belt conveyor 4. The batch number associated with an article 2 may also be included in this list or database.

The operation of the system 1 is described in the following with reference to FIG. 5. In a first action Act1, a container with an article A is moved to the pick-up position Pa on the supplying belt conveyor 3. In an action Act2, the sensor unit 6 detects the position and/or orientation of the article A at the pick-up position Pa. In an action Act3, the manipulation unit 5 picks up the article. In an action Act4, the manipulation unit 5 transfers the article A to the release position Pf. In an action Act5, the manipulation unit 5 releases the article A and drops it, for example, through the identification sensor 8.

From this point on, two courses of action are carried out in parallel. On the one hand, the manipulation unit 5 may move back from the release position Pf to the pick-up position Pa in action Act4 in order to pick up an article B in action Act3, which has been supplied in a new container in the meantime in action Act1. At the same time, article A drops through the identification device 8 and is scanned thereby in action Act6 and identified in action Act7. In action Act8, the article A lands on the zero position P0. In the example shown, article A has not been identified and is therefore moved by the position conveyor 11 to the second position P2 in action Act9.

While the position conveyor 11 moves the article A to the second position P2, the manipulation unit 5 may already pick up the article B in action Act3 and move it to the release position Pf in action Act4. Meanwhile, the sensor unit 6 or the other second sensor unit, respectively, in action Act10 already determines the position and/or orientation of the article A on the second position P2.

After the manipulation unit 5 has released the article B at the release position Pf, it is not moved to the pick-up position Pa in action Act4, but to the second position P2 in order to pick up the article A again in action Act3. From there, the manipulation unit 5 moves the article A again to the release position Pf in action Act4 and releases it there. While these actions were being carried out by the manipulation unit 5, article B has already dropped through the identification unit 8, been scanned and identified thereby and landed on the zero position P0. In this example, article B has been identified and moved from the zero position P0 to the first position P1 by the position conveyor 11 in action Act11 such that the method for article B terminates.

Figure 5:
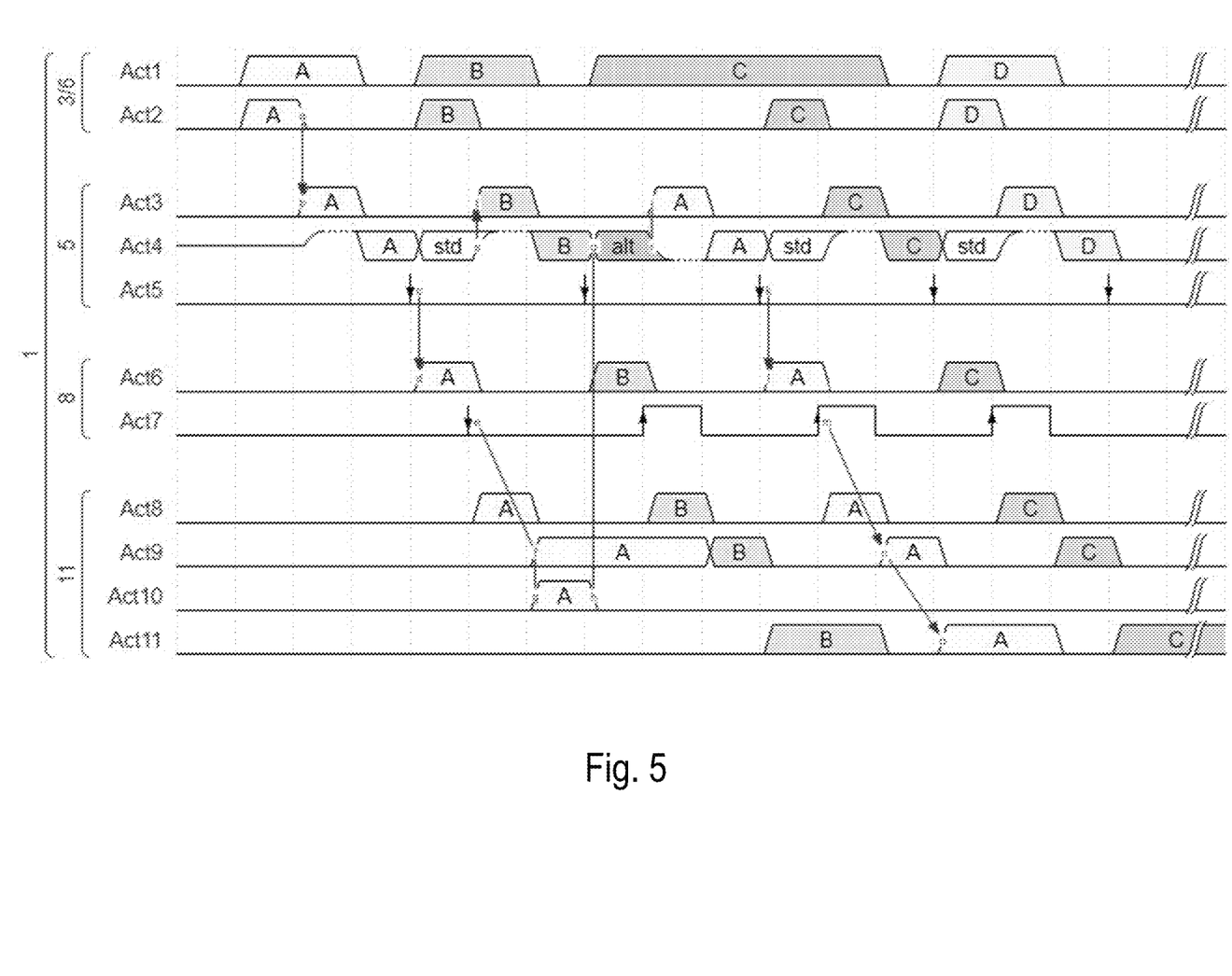
FIG. 5 shows a flow chart that may be obtained by the system according to the invention when separating articles.

While the article B was moved from the zero position P0 to the first position by the position conveyor 11, the article A dropped through the identification unit 8 by the release of the manipulation unit 5 (which then immediately moved back to the pick-up position Pa to pick up a new article C, as there was no article 2 at the second position P2) and has been identified and therefore moved from the zero position P0 to the first position P1 by the position conveyor on the second attempt, as shown in FIG. 5.

It can be seen that in this method two courses of action are always processed in parallel, since when the manipulation unit 5 moves from the release position Pf to the pick-up position Pa or to the second position P2, an article 2 may be simultaneously identified by the identification unit 8 and moved to the correct position by the position conveyor 11 correspondingly.

In this method, each article 2 may be tracked separately and, in particular, a batch number, which is specified by a container of the article 2 on the supplying conveyor element 3, may also be tracked and taken along during separation and identification. The batch number may be read from the container by the sensor unit 6 and transmitted to the control unit 7, for example. However, the control unit 7 could also receive the batch number in another way, for example via a wide control input. Thus, even if an article 2 from a first container, i.e. with a first batch number, is not identifiable at the beginning and is moved to the second position P2, and another article 2 from a second container, i.e. with a second batch number, is taken along by the manipulation unit 5, is identified by the identification unit 8 and is therefore moved to the first position, the batch number for the articles may always be taken along. In this example, the second article with the second batch number would overtake the article item with the first batch number, since the first article was non-identifiable and must pass through the identification unit 8 at least one more time.

In further embodiments not shown, multiple second positions P2 could also be provided to hold several non-identifiable articles 2 ready to be picked up and identified again. All of the several second positions are situated within the handle region of the manipulation unit 5. This also allows the manipulation unit 5 to have one or more articles 2 waiting at the second positions P2 to have previously non-identified articles picked up and identified by the supplying conveyor element 3.

In addition, the position conveyor 11 may be configured to move an article 2 to a third position if the article 2 has not been identified following a predetermined number of identification attempts. In this case, the position conveyor 11 receives a corresponding instruction from the counter 14 of the control unit 7. There may also be provided several third positions in order to set aside several articles 2. Articles 2 situated at the third position may be sorted out or may be manually identified.

Figure 6:
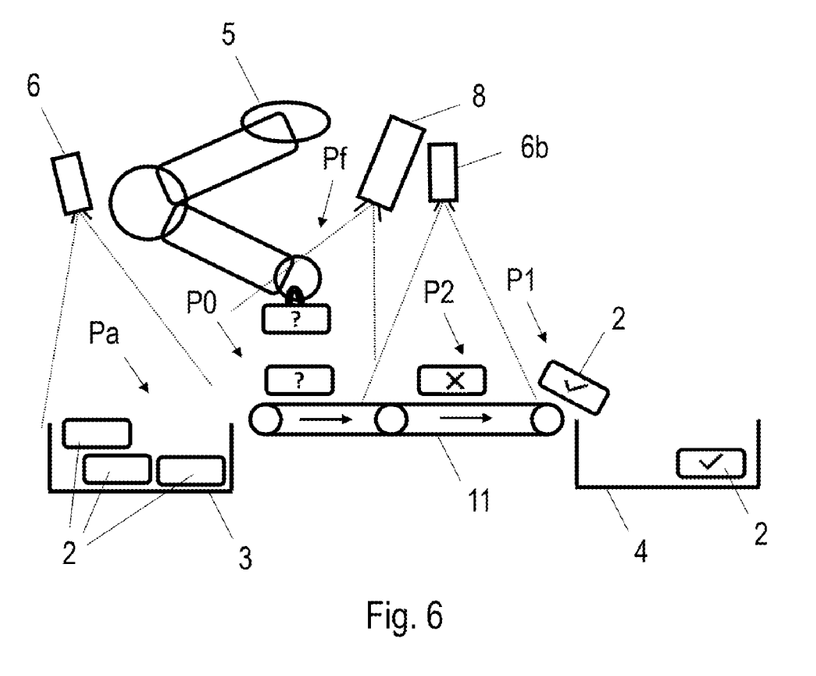
FIG. 6 shows a third embodiment of the system according to the invention for separating and identifying articles in a schematic view, wherein the position conveyor only conveys in one direction.

FIG. 6 shows a particularly practical embodiment, in which the position conveyor 11 is a belt conveyor that only conveys in one direction. The article 2 comes to rest at a zero position P0 on the belt conveyor. If the article 2 has not been detected by the identification unit 8, the article 2 will be moved by the belt conveyor to a second position P2, where the article 2 comes to a standstill to be picked up again by the manipulation unit 5. If the article 2 has been identified by the identification unit 8, the article 2 will be moved from the zero position P0 via the second position P2, where the article usually does not come to a standstill, to the first position P1. The first position P1 may, for example, be the transfer point from the position conveyor 11 to the discharging belt conveyor 6 or also a position on the discharging belt conveyor 6 or on the position conveyor 11 itself.

As depicted in FIG. 6, there may further be used a manipulation unit 5 mounted at the ceiling. This embodiment, however, is not limited to this concrete arrangement but may rather also be used in combination with other variants.

The invention claimed is:

1. A system, comprising:
    a source position, comprising a supplying conveyor element operable to provide articles,
    a discharging conveyor element operable to discharge identified and separated articles,
    a manipulation unit operable to move articles from the source position in the direction of the discharging conveyor element,
    a sensor unit operable to detect the position and/or orientation of the articles at the source position,
    wherein the manipulation unit is configured to pick up the articles from the source position according to the position and/or orientation detected by the sensor unit,
    an identification unit, which is configured to identify the articles moved by the manipulation unit in the direction of the discharging conveyor element,
    wherein the discharging conveyor element comprises a position conveyor, which is configured to convey the article to a first position if this has been identified by the identification unit and to convey the article to a second position (P2) if this has not been identified by the identification unit, wherein the articles are present at the second position (P2) separated from the articles at the source position, wherein the second position (P2) is arranged within a handle region of the manipulation unit, and wherein the manipulation unit is configured to again pick up an article present at the second position (P2) and to move it via the identification unit to the position conveyor.

2. A system according to claim 1, wherein the manipulation unit is configured to release the article picked up from the source position at a release position (Pf), which is situated in the movement direction of the article upstream of the identification unit, and to move upon release of the article immediately in the direction of the source position for picking up a new article if no article is present at the second position (P2) or to move to the second position (P2) for picking up an article previously not identified in order to pick up this article and to move it again to the identification apparatus.

3. A system according to claim 1, wherein the identification unit has a spatially extended detection region having an entry region and an exit region spaced apart therefrom, wherein the entry region is arranged above the exit region.

4. A system according to claim 1, wherein the manipulation unit, the identification unit and the position conveyor are arranged in relation to one another such that an article released by the manipulation unit will drop or slip through the identification unit and will come to rest downstream of the identification unit at a zero position (P0) on the position conveyor.

5. A system according to claim 1, wherein the identification unit has at least one individual sensor comprising a camera having different orientations, a scanner, or RFID reader.

6. A system according to claim 1, comprising a control unit having a counter which is configured to record the numbers of the identification attempts of non-identifiable articles.

7. A system according to claim 6, wherein the control unit, the position conveyor and/or the manipulation unit are configured to move a non-identifiable article into a third position or to allocate this a predetermined identification if the number of identification attempts counted by the counter has reached a predetermined value.

8. A system according to claim 1, wherein the manipulation unit is configured to release an article picked up from the second position (P2) in a different orientation to the identification unit than articles, which have been picked up from the source position.

9. A system according claim 1, wherein the sensor unit has a field of vision, in which articles to be picked up are situated at the source position, wherein there is provided a second sensor unit, which has a second field of vision, in which the second position (P2) is situated.

10. A system according to claim 1, wherein the sensor unit has a field of vision, in which there are situated articles to be picked up at the source position as well as also the second position (P2) at the position conveyor.

11. A system according to claim 1, wherein the position conveyor is configured to convey articles from a zero position (P0), at which the articles will come to rest downstream of the identification unit on the position conveyor, either to the first position (P1) or to the second position (P2).

12. A system according to claim 11, wherein the position conveyor comprises a single belt conveyor for moving the articles from the zero position (P0) to the first position (P1) as well as to the second position (P2), wherein the belt conveyor may be moved in opposite directions.

13. A system according to claim 11, wherein the position conveyor comprises a disc conveyor, a turntable, a push conveyor, a pusher, a rocker or a drop flap.

14. A system according to claim 1, wherein the position conveyor is configured to move articles from a zero position (P0), at which the articles will come to rest downstream of the identification unit on the position conveyor, via the second position (P2) to the first position (P1).

15. A system according to claim 14, wherein the position conveyor has a belt conveyor conveying only in one direction for moving the articles from the zero position (P0) to the first position (P1) and to the second position (P2), wherein the belt conveyor is configured to stop the article at the second position (P2) if the article has not been identified by the identification unit and to move it from the zero position (P0) via the second position (P2) to the first position (P1) if the article has been identified by the identification unit.

16. A system, comprising:
a source position, comprising a supplying conveyor element operable to provide articles in containers,
a discharging conveyor element operable to discharge identified and separated articles,
a manipulation unit operable to move articles from the source position in the direction of the discharging conveyor element,
a sensor unit operable to detect the position and/or orientation of the articles at the source position,
wherein the manipulation unit is configured to pick up the articles from the source position according to the position and/or orientation detected by the sensor unit,
an identification unit, which is configured to identify the articles moved by the manipulation unit in the direction of the discharging conveyor element,
wherein the discharging conveyor element comprises a position conveyor, which is configured to convey the article to a first position if this has been identified by the identification unit and to convey the article to a second position (P2) if this has not been identified by the identification unit, wherein the articles are present at the second position (P2) separated from the articles at the source position,
wherein the second position (P2) is not located on a supplying conveyor element,
wherein the second position (P2) is arranged within a handle region of the manipulation unit, and
wherein the manipulation unit is configured to again pick up an article present at the second position (P2) and to move it via the identification unit to the position conveyor.

* * * * *